Figure 1:
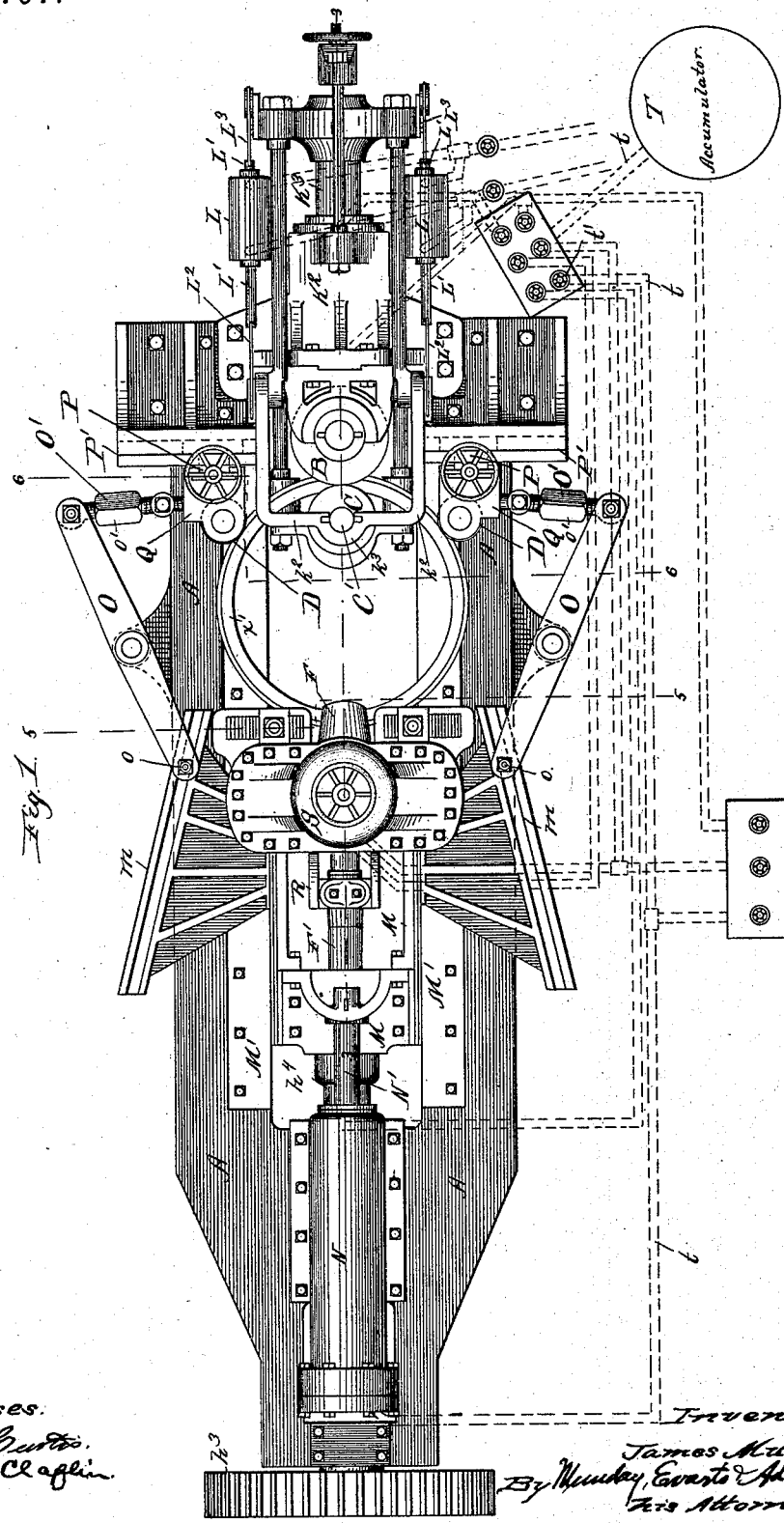

(No Model.)  5 Sheets—Sheet 1.

J. MUNTON.
TIRE ROLLING MILL.

No. 416,797. Patented Dec. 10, 1889.

Witnesses.
Inventor:
James Munton
By Munday, Evarts & Alcock
His Attorneys.

(No Model.) 5 Sheets—Sheet 4.

J. MUNTON.
TIRE ROLLING MILL.

No. 416,797. Patented Dec. 10, 1889.

Witnesses:
Geo. E. Curtis.
Mack A. Claflin

Inventor:
James Munton
By Munday Evarts
and Adcock
His Attorneys (No Model.) 5 Sheets—Sheet 5.

J. MUNTON.
TIRE ROLLING MILL.

No. 416,797. Patented Dec. 10, 1889.

Witnesses:
Geo. C. Curtis.
Mack A. Claflin.

Inventor:
James Munton
By Munday, Evarts & Adcock
His Attorneys.

UNITED STATES PATENT OFFICE.

JAMES MUNTON, OF MAYWOOD, ASSIGNOR TO HIMSELF, AND CHARLES H. FERRY, OF CHICAGO, ILLINOIS.

TIRE-ROLLING MILL.

SPECIFICATION forming part of Letters Patent No. 416,797, dated December 10, 1889.

Application filed August 5, 1889. Serial No. 319,823. (No model.)

*To all whom it may concern:*

Be it known that I, JAMES MUNTON, a citizen of the United States, residing in Maywood, in the county of Cook and State of Illinois, have invented a new and useful Improvement in Tire-Rolling Mills, of which the following is a specification.

My invention relates to improvements in machines for rolling or forming blooms or tires, and more particularly to improvements upon the machine heretofore patented to me in Letters Patent Nos. 363,843 and 401,713.

The object of my present invention is to provide means for rolling or forming two or more rings or tires simultaneously from a single annular ingot and to improve the general character of the machine in respect to its efficiency, durability, ease, and rapidity of operation.

One feature of my present improvement consists in mounting the guide-rolls, which are adjacent to the main vertical driven roll and to the inside vertical pressure-roll, on laterally-moving slides, which are adjusted or moved out automatically as the tire or ring increases in diameter by means of a slide carrying two exterior pressure-rolls diametrically opposite the main exterior driven roll. This latter slide is furnished with angle grooves or cams, which actuate levers pivoted to the laterally-moving slides upon which the guide-rolls are mounted.

Another feature of my improvement consists in making the guide-rolls and the two exterior pressure-rolls vertically adjustable, so that by adjusting one or other of the guide-rolls up or down the tendency of the tire or bloom being rolled to climb up may be counteracted and the same caused to run truly in a horizontal plane.

To adapt the machine to roll two or more rings or tires simultaneously, I provide the slide which carries the inside vertical pressure-roll with a vertically-swinging hanger furnished with a box or bearing for the upper end of the inside pressure-roll, so as to give the upper end of this pressure roll or shaft the requisite support to roll two or more rings or one very wide ring or bloom. This vertically-swinging hanger is turned back out of the way when the blooms or rings are being placed in or taken out of the machine by means of a small hydraulic cylinder or other suitable engine or power.

Another feature of my improvement consists in mounting the inside pressure-roll so that it revolves upon its shaft, the shaft being made non-rotary. By this means I am enabled to overcome the difficulty arising from the scales dropping down into the bearings of the inside pressure-roll shaft.

Other features of my improvement consist in the novel devices and novel combinations of parts and devices herein shown and described, and more particularly pointed out in the claims.

Figure 2:
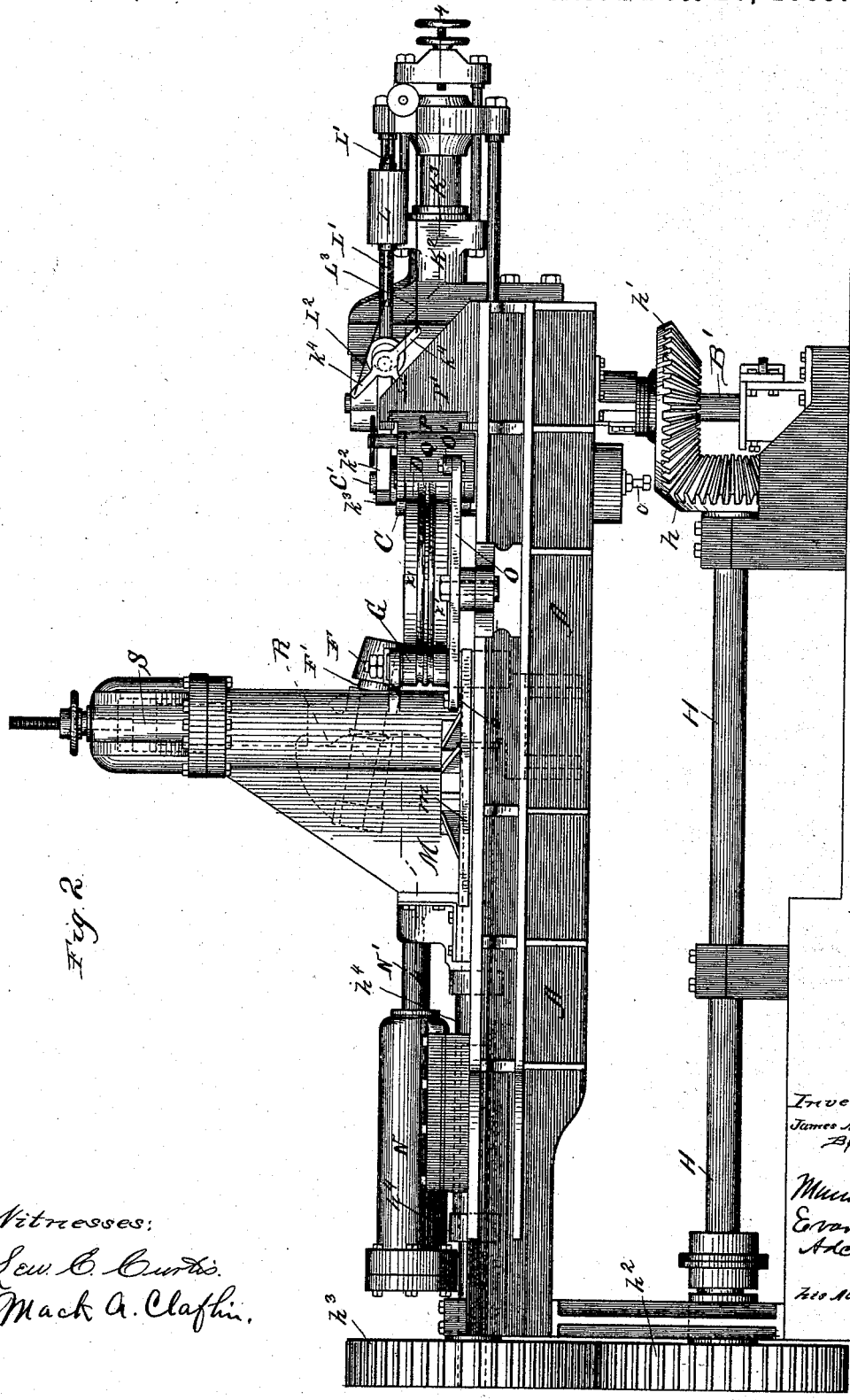
Figure 3:
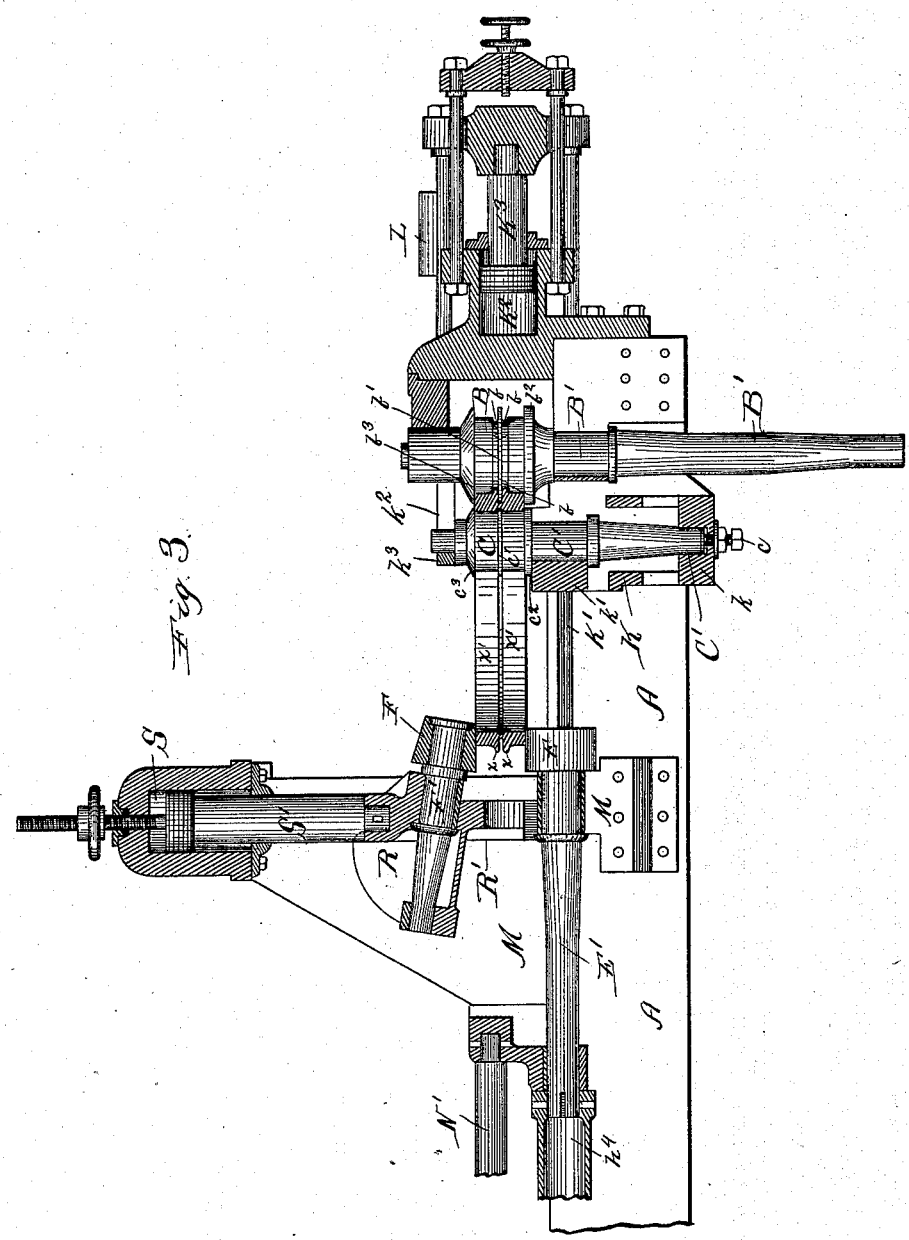
Figure 4:
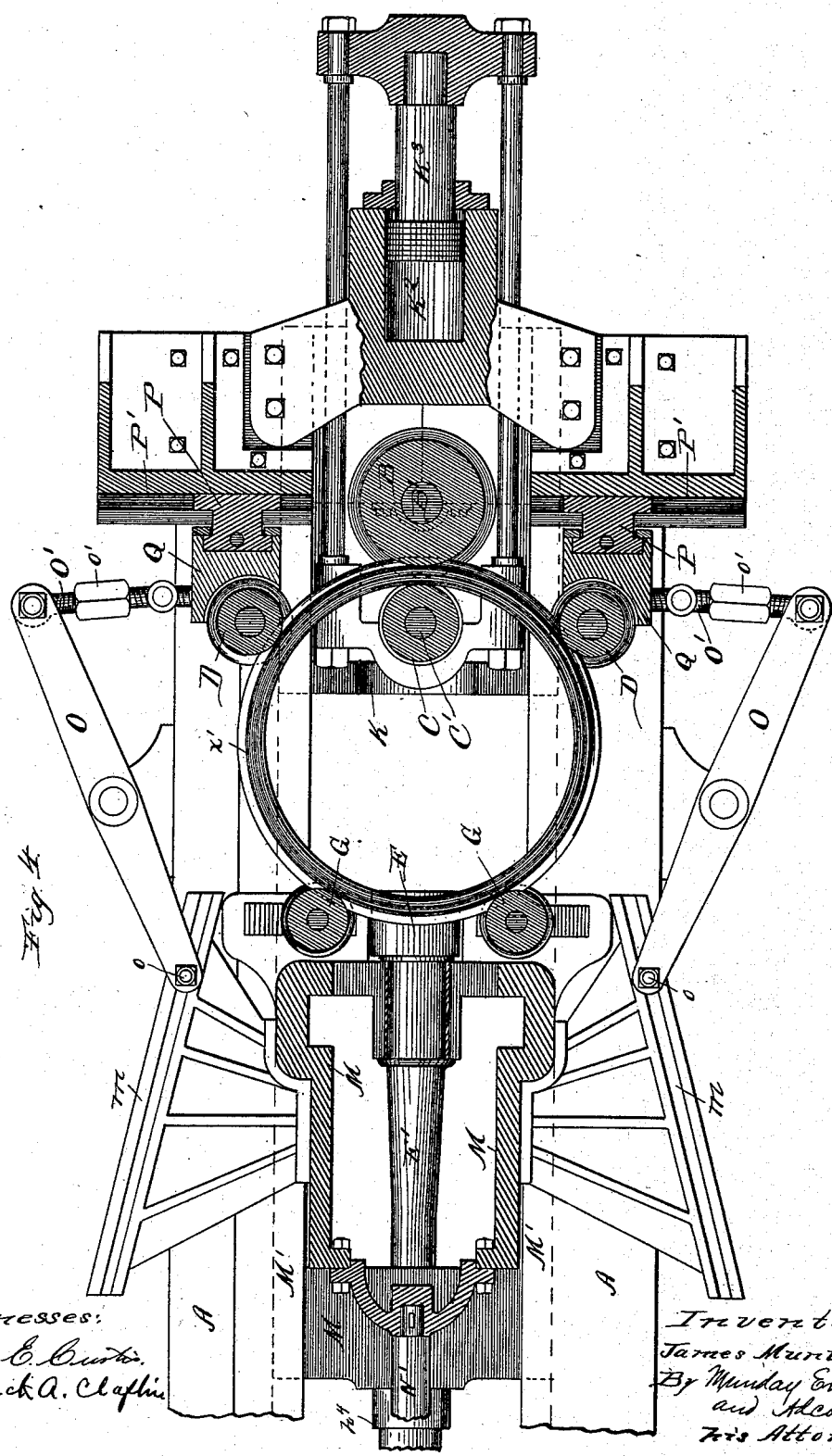
Figure 5:
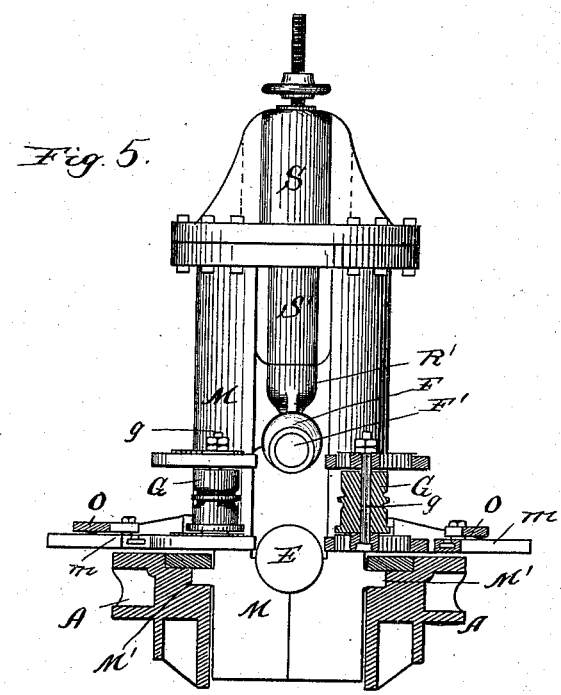
Figure 6:
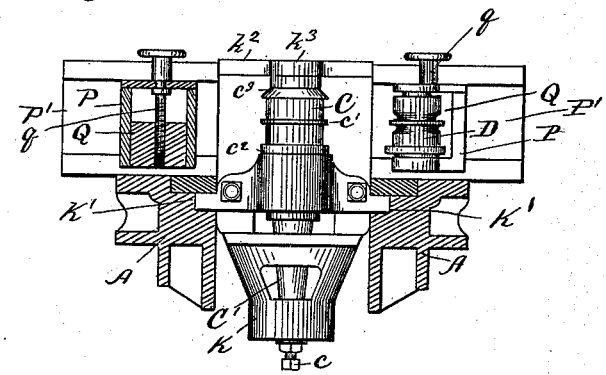

In the accompanying drawings, which form a part of this specification, and in which similar letters of reference indicate like parts, Figure 1 is a plan view of a tire-rolling machine embodying my invention. Fig. 2 is a side elevation. Fig. 3 is a partial central vertical section on line 3 3 of Fig. 1. Fig. 4 is a partial horizontal section on line 4 4 of Fig. 2; and Figs. 5 and 6 are vertical cross-sections on lines 5 5 and 6 6, respectively, of Fig. 1.

In the drawings, A represents the bed or frame of the machine. B is the main exterior vertical driven roll; C, the inside vertical pressure-roll; D D, the automatically actuated or adjusted guide-rolls adjacent thereto; E, Fig. 4, the horizontal driven edging-roll; F, the vertical movable or pressure edging-roll, and G G the two exterior pressure-rolls diametrically opposite the main exterior driven roll B. The roll B or its shaft B' is driven from the main driving-shaft H by the beveled gears $h$ and $h'$. The horizontal driven edging-roll E or its shaft E' is driven from the driving-shaft H by the spur-gears $h^2$ $h^3$ and the sleeve $h^4$, which is splined to the shaft E', so that the said shaft may reciprocate in said sleeve.

The vertical inside pressure-roll C is journaled or revolves loosely on its non-revolving shaft C', which is mounted upon a sliding carriage K, which reciprocates in suitable guides K' on the frame of the machine and is actuated by a hydraulic cylinder $K^2$ and piston $K^3$. The slide or carriage K has a bearing $k$ for the lower end of the shaft C' and a bearing or support $k'$ for the middle portion of the shaft, and a pivoted or vertically-movable hanger $k^2$, having a bearing or support $k^3$ for the upper end of the shaft $C'$. The hanger $k^2$ is preferably pivoted to the slide K, so that it may swing vertically out of the way of the tire or bloom which is being placed in or taken out of the machine. The pivoted hanger $k^2$ is preferably operated by a hydraulic cylinder L, the piston $L'$ of which is connected by links or cables $L^2$ $L^3$ with arms $k^4$ $k^4$, projecting from the shaft or pivot of the hanger $k^2$. By this means the vertically-swinging hanger $k^2$ may be easily and quickly moved out of the way and replaced in position. The shaft $C'$ of the roll C may be adjusted vertically up and down by means of a screw $c$.

The driven edging-roll E and also the exterior pressure-rolls G G are mounted upon and carried by a horizontally-moving slide M, which travels in suitable guides $M'$ on the main frame of the machine, and is actuated by a hydraulic cylinder N and its piston $N'$. The sliding carriage M is furnished with cams or inclined grooves $m$ $m$, in which fit pins or rollers $o$, carried by the laterally-vibrating levers O O, which serve to automatically adjust the guide-rolls D D. The guide-rolls D D are carried by laterally-moving slides P P, which travel in transverse guides $P'$ $P'$ on the main frame of the machine. The guide-rolls D D are mounted or journaled upon vertically-adjustable slides or blocks Q Q, which slide in suitable guides upon the transverse slides P P. The motion of the levers O O is communicated to the guide-rolls D D by means of pivoted links $O'$ $O'$, which are furnished with screw-threads and turn-buckles $o'$ $o'$ for purposes of adjustment. As the exterior pressure-rolls G G are carried by the same slide M which through its cams $m$ actuates the guide-rolls D D, the guide-rolls D D will be automatically and continually kept in proper position relative to the expanding diameter of the tire to maintain it of a true circular shape. By this means I am enabled to roll the tires or rings with great trueness and uniformity. The movable or edging pressure-roll F is made conical, and its shaft $F'$, upon which it loosely fits and revolves, is mounted at an angle, preferably substantially as shown, in the vertical slide R, so as to compensate for the increased diameter of the tire at its outer edge and prevent slipping and unnecessary friction. The vertical slide R, Fig. 3, reciprocates in suitable guides $R'$ on the horizontal slide M, by which it is carried. The vertical slide or carriage R is moved up and down or actuated by means of a hydraulic cylinder S on the slide M and its piston $S'$.

The rolls B and C may be made of any form desired, according to the particular kind of work designed to be done by the mill, the rolls being readily removable from their shafts $B'$ $C'$. The particular rolls B C which are shown in the drawings, however, are of a novel construction, the same being designed for the purpose of severing an annular ingot into distinct rings or tires.

To enable me to form the flanges of the tires out of the inside and best portion of the ingot, where the metal is of the most perfect character and free from imperfections, I provide the roll B with annular grooves $b$, adjacent to the cutter-flange $b'$, so that the flanges $x$ $x$ on the two contiguous tires $x'$ $x'$ will both be formed adjacent to the line on which the annular ingot or ring is severed. The inside or movable roll C may also be provided, if desired, with a cutter-flange $c'$, opposite the cutter-flange $b'$. The rolls B C are also furnished with bottom collars $b^2$ $c^2$. The rolls B C may also be furnished with cutter flanges or collars $b^3$ $c^3$, for the purpose of severing a thin annular chip of imperfect metal from the top portion of the annular casting at the same time that it is severed into two or more tires.

In the operation of the machine, when the tire or bloom is being rolled outward, or to a larger diameter, I prefer to roll or force the tire outward against the constant pressure of the exterior rolls G G and of the guide-rolls D D, so that the expanding tire or ring will itself automatically adjust the position of the rolls G G and D D, and thus not only save the labor of the man or men heretofore usually employed for adjusting these rolls, but also enable me to roll the tires or rings of a true circular form. In this particular method or process of using the machine I ordinarily roll the tire outward against the pressure exerted upon the rolls G G D D or upon their operating-slide M through the hydraulic cylinder and piston N $N'$ by the accumulator. The pressure of the accumulator, as commonly employed in a tire-rolling mill, is ordinarily about three hundred and fifty pounds to the square inch, and this I find to be a suitable degree of pressure to use ordinarily. The degree of pressure on the rolls G G D D, and against which the tire is rolled outward, should or may be, however, varied materially according to weight and diameter or strength of the ring being rolled. The required pressure upon the exterior rolls G G D D may be exerted by any suitable means—for example, in tire-mills where the ordinary accumulator is not employed the pressure may be communicated directly from one of the pumps to the hydraulic cylinder N. I prefer to take the pressure from the accumulator, as it affords a steady and even pressure against which to roll the tire outward.

In the drawings, the accumulator is indicated at T, and $t$ is the pipe or connection between the accumulator and the cylinder N. The construction of the accumulator is well known to those skilled in the art, and it therefore needs no special description. As ordinarily constructed it consists simply of a large cylinder with a heavily-weighted piston or ram. When rolling the tire outward against the pressure of the accumulator, the valve controlling the communication between the accumulator and the cylinder N, and which is indicated at $t'$, Fig. 1, is left open, so that the tire, as it increases in diameter, must force the rolls G G D D to recede against the yielding pressure exerted upon the piston N' of the cylinder N. The pressure exerted upon the exterior rolls G G D D by the cylinder and piston N N' is of course less than that exerted upon the inside pressure-roll C, when the tire is being rolled outward, as otherwise the diameter of the tire would not increase.

It will be understood, of course, that my new or improved mill, herein shown and described, may be used in the old method as well as in the new method just above mentioned; or, in other words, that the position of the rolls G G and D D may be from time to time adjusted by the operator. The vertical adjustment of the guide-rolls D D is effected by means of adjusting-screws $q$ $q$, Fig. 6, threaded into the vertically-movable blocks Q Q, and the vertical adjustment of these guide-rolls G G is effected by means of adjusting-screws $g$ $g$.

By mounting the upper edging-roll F loosely and so as to revolve on its non-revolving shaft F', I obviate the difficulty heretofore experienced of the shaft F' getting out of line by reason of unequal wear in its two bearings, owing to the pressure of the hydraulic cylinder and piston S S' thereon.

I do not herein claim the process of rolling tires or rings outward or from a smaller to a larger diameter against the yielding and continuous pressure of exterior rolls which are caused to recede and adjust themselves automatically by the expansion of the tire itself as it increases in diameter, as that forms the subject-matter of my pending application, Serial No. 319,824, filed August 5, 1889.

I claim—

1. The combination, with the main exterior driven roll, of the inside movable pressure-roll and a slide upon which said pressure-roll is carried, furnished with a movable hanger for supporting the upper end of the pressure-roll shaft, substantially as specified.

2. The combination, with an exterior driven roll, of the inside movable pressure-roll and a slide upon which said pressure-roll is carried, furnished with a movable hanger for supporting the upper end of the pressure-roll shaft, a hydraulic cylinder and piston for operating said slide, and a hydraulic cylinder and piston for operating said movable hanger, substantially as specified.

3. The combination, with a main exterior driven roll, of inside movable pressure-roll and a slide upon which said pressure-roll is carried, furnished with a movable hanger for supporting the upper end of the pressure-roll shaft, a pair of edging-rolls, and a slide upon which said edging-rolls are carried, substantially as specified.

4. The combination, with a main exterior driven roll, of inside movable pressure-roll and a slide upon which said pressure-roll is carried, furnished with a movable hanger for supporting the upper end of the pressure-roll shaft, and two exterior rolls opposite said main driven roll, and a slide upon which said exterior pressure-rolls are carried, substantially as specified.

5. The combination, with a main exterior driven roll, of an inside pressure-roll, two exterior pressure-rolls G G, opposite said main driven roll, a slide M, upon which said exterior pressure-rolls are carried, a pair of guide-rolls D D, adjacent to said main driven roll, and connecting mechanism between said slide M and guide-rolls D D for automatically adjusting said guide-rolls from and by the movement of the slide M, substantially as specified.

6. The combination of the main exterior driven roll with the inside pressure-roll and a pair of vertically-adjustable guide-rolls D D, substantially as specified.

7. The combination, with main exterior driven roll B, inside pressure-roll C, vertically-adjustable slide or blocks Q Q, and guide-rolls D D upon said slides Q Q, substantially as specified.

8. The combination with main exterior driven roll B, inside pressure-roll C, laterally-adjustable slides P P, vertically-adjustable slides Q Q, and guide-rolls D D, substantially as specified.

9. The combination, with main exterior driven roll B, inside pressure-roll C, laterally-adjustable slides P P, vertically-adjustable slides Q Q, and guide-rolls D D, slide M, exterior pressure-rolls G G, mounted upon said slide M, said slide M being furnished with cams $m$ $m$, levers O O, and connecting-links O' O', substantially as specified.

10. The combination of main driven roll B with inside pressure-roll C, guide-rolls D D, slide M, carrying exterior pressure-rolls G G and furnished with cams $m$ $m$, levers O O, and connecting-links O' O', substantially as specified.

11. The combination, with main exterior driven roll B, of an inside pressure-roll C, a slide upon which it is mounted, a hydraulic cylinder and piston for operating said slide, edging-rolls E F, a slide M, by which they are carried, a hydraulic cylinder and piston for operating said slide; said slide M being provided with a vertically-movable slide R, and a hydraulic cylinder and piston S S' for operating said slide R, the shaft of said movable edging-roll F being journaled at an angle in said slide R and said roll F being of a conical form, substantially as specified.

12. The combination of the main exterior driven roll and inside pressure-roll for rolling the tire or ring outward, with exterior movable or pressure rolls automatically adjusted in position by the tire or ring itself as it expands in diameter, substantially as specified.

13. The combination of the main exterior driven roll and inside pressure-roll for rolling the tire or ring outward, with exterior or movable pressure-rolls G G and guide-rolls D D, connected with and operated from said rolls G G, said rolls G G and D D being combined, arranged, and adapted to be automatically adjusted in position by the tire itself as it increases in diameter, substantially as specified.

14. The combination of the main exterior driven roll B and inside pressure-roll C for rolling the tire or ring outward or to a larger diameter, with exterior movable pressure-rolls G G opposite said main driven roll, a slide carrying said rolls G G, a hydraulic cylinder and piston N N' for operating said slide, a hydraulic cylinder and piston for operating said inside pressure-roll C, and means for exerting a degree of pressure in said cylinder and piston N N', against which pressure the tire itself, as it increases in diameter, forces the rolls G G to recede, and thus to continuously and automatically adjust their position, substantially as specified.

15. The combination of the main exterior driven roll B and inside pressure-roll C for rolling the tire or ring outward or to a larger diameter, with exterior movable pressure-rolls G G opposite said main driven roll, a slide carrying said rolls G G, a hydraulic cylinder and piston N N' for operating said slide, a hydraulic cylinder and piston for operating said inside pressure-roll C, and means for exerting a degree of pressure in said cylinder and piston N N', against which pressure the tire itself, as it increases in diameter, forces the rolls G G to recede and thus to continuously and automatically adjust their position, and guide-rolls D D, connected with and operated from said rolls G G, substantially as specified.

16. The combination, in a tire-rolling mill, of slide M with edging-rolls E F, vertically-moving slide R, mounted on said slide M, hydraulic cylinder S and piston S' for operating said slide R, and non-revolving shaft F', mounted upon and carried by said slide R, said roll F being mounted loosely, so as to revolve on said shaft F', substantially as specified.

17. In a tire-rolling mill, the combination of a main exterior driven roll B, inside pressure-roll C and its non-revolving shaft C', said roll C being mounted loosely to revolve on said shaft C', substantially as specified.

18. In a tire-rolling mill, the combination of a main exterior driven roll B, inside pressure-roll C and its non-revolving shaft C', said roll C being mounted loosely to revolve on said shaft C', and slide K, carrying said shaft C' and provided with a movable hanger $k^2$ for supporting the upper end of said shaft C', substantially as specified.

JAMES MUNTON.

Witnesses:
H. M. MUNDAY,
EDMUND ADCOCK.